(12) United States Patent
Maruyama

(10) Patent No.: US 6,522,702 B1
(45) Date of Patent: Feb. 18, 2003

(54) RADIO DATA COMMUNICATION TERMINAL

(75) Inventor: Hidenori Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/294,983

(22) Filed: Apr. 20, 1999

(30) Foreign Application Priority Data

Apr. 22, 1998 (JP) .......................................... 10-112277

(51) Int. Cl.[7] .............................................. H04L 27/14
(52) U.S. Cl. ........................ 375/324; 375/316; 375/229
(58) Field of Search ................................ 375/324, 340, 375/229, 316

(56) References Cited

U.S. PATENT DOCUMENTS

| | | | | | |
|---|---|---|---|---|---|
| 3,962,637 A | * | 6/1976 | Motley et al. | ............... | 375/232 |
| 6,144,708 A | * | 11/2000 | Maruyama | ................... | 375/327 |
| 6,151,371 A | * | 11/2000 | Maruyama | ................... | 375/344 |

FOREIGN PATENT DOCUMENTS

| | | | | |
|---|---|---|---|---|
| JP | 5-252078 | | 9/1993 | |
| JP | 6-188786 | | 7/1994 | |
| JP | 6-188787 | | 7/1994 | |
| JP | 6-252698 | | 9/1994 | |
| JP | 6-291756 | | 10/1994 | |
| JP | 06350663 | * | 12/1994 | ........... H04L/27/38 |
| JP | 7-38618 | | 2/1995 | |
| JP | 7-87141 | | 3/1995 | |
| JP | 8-18492 | | 1/1996 | |
| WO | 95/17052 | | 6/1995 | |

OTHER PUBLICATIONS

Japanese Office Action issued Oct. 31, 2000 in a related application with English translation of relevant portions.

* cited by examiner

*Primary Examiner*—Chi Pham
*Assistant Examiner*—Kevin M Burd
(74) *Attorney, Agent, or Firm*—Dickstein, Shapiro, Morin & Oshinsky, LLP.

(57) ABSTRACT

A radio data communication terminal that includes a phase rotator for correcting a narrow-band modulation system, an equalizer for correcting a transmission path distortion of the frame signal corrected in phase, and a calculating circuit for calculating the phase error by using a preamble in the frame signal, he phase error is used for the phase error correction in the phase rotating means. The terminal further includes a transmission path distortion estimator for estimating the transmission path distortion by using the preamble in the frame signal corrected in phase and calculating tap coefficients necessary for the equalizer. A setter is provided for setting the tap coefficients to the equalizer and a first delay circuit delays the frame signal. A selection circuit selects an input or output of the first delay circuit and outputs the selected one to the phase rotator so that the calculating circuit and the transmission path distortion estimator operate while using the same portion of the preamble.

9 Claims, 4 Drawing Sheets

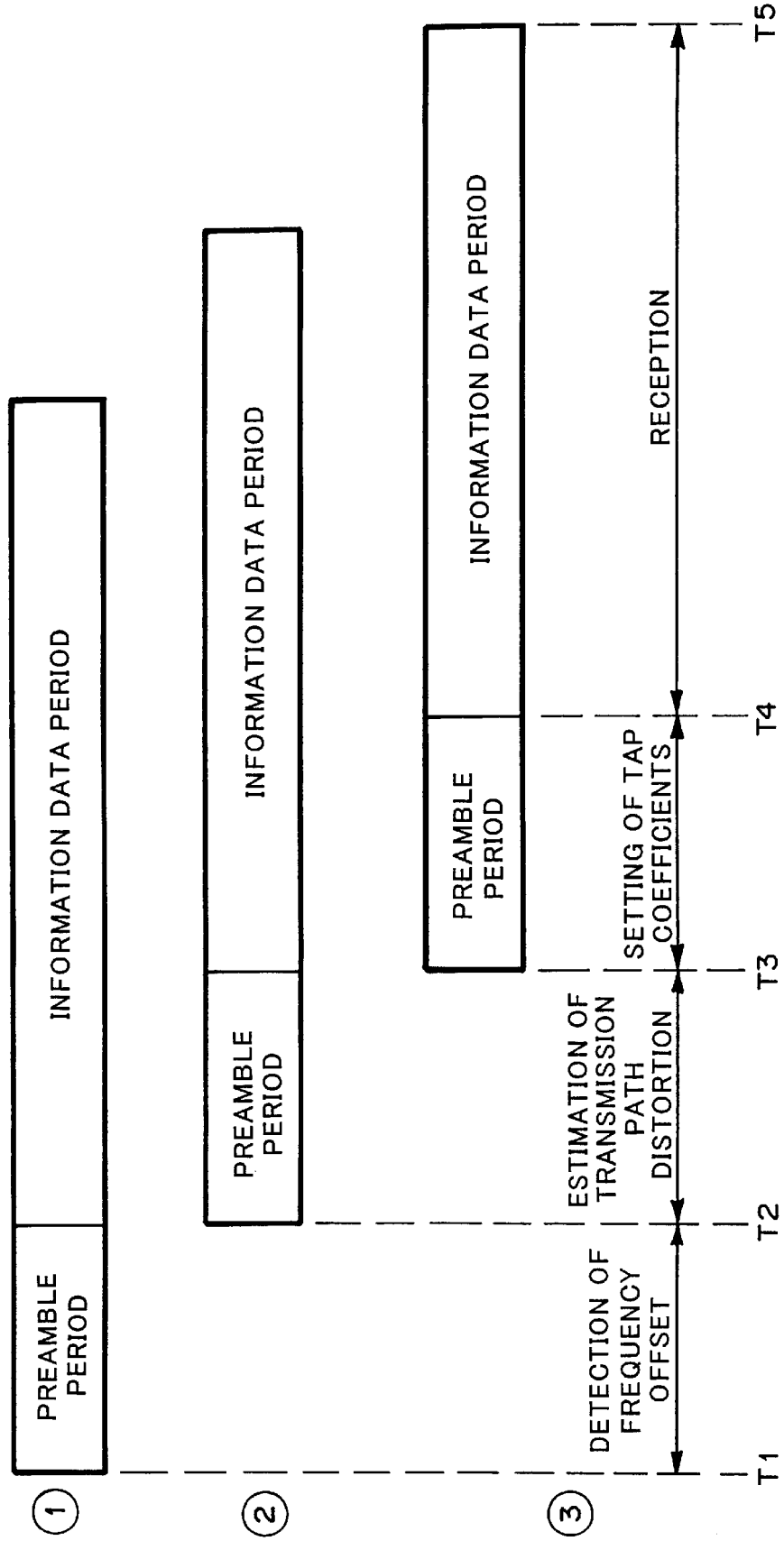
F I G. 4

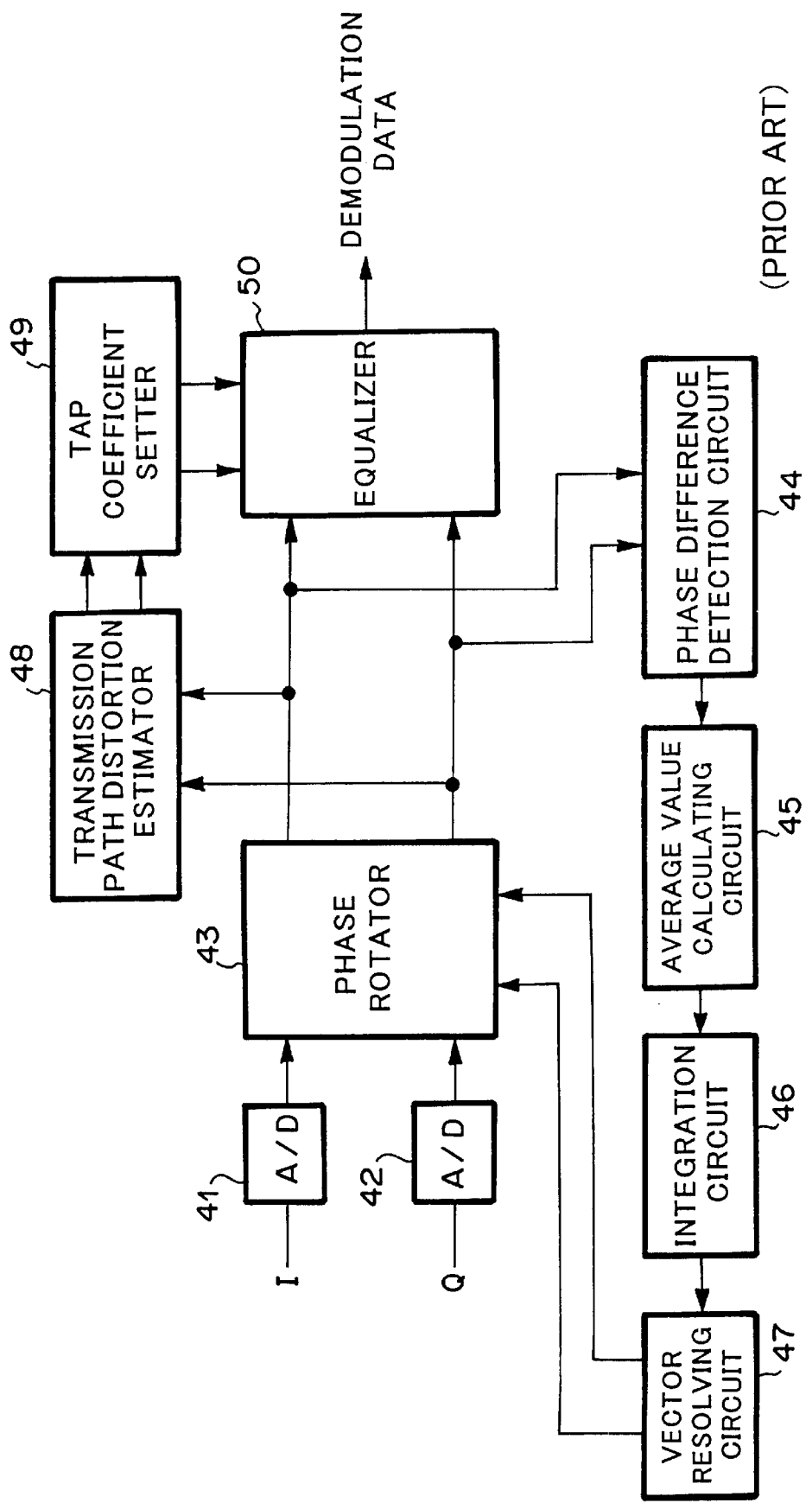

RADIO DATA COMMUNICATION TERMINAL

BACKGROUND OF THE INVENTION

1. Field of the Invention:

The conventional radio data communication terminal shown in FIG. 5 includes A/D converters 41 and 42 for A/D-converting I (in-phase), Q (quadrature) signals which have been orthogonally demodulated in an RF unit (not shown). The terminal further includes a phase rotator 43 for rotating the phase of the received signals by a desired phase detection circuit 44 for detecting phase difference between the present angle and an angle before one period. The terminal further includes a average value calculating circuit 45 for calculating an average value by summing the phase differences detected by phase difference detection circuit 44 by a predetermined number of times and dividing the summation by the predetermined number and the number of symbols in the period. The terminal further includes a integration circuit 46 for integrating the average detected by average value calculating circuit 45 every symbol time. The terminal further includes a vector resolving circuit 47 for resolving the integrated value supplied from integration circuit 46 to a real part and an imaginary part and outputting them to phase rotator 43. The terminal further includes a transmission path distortion estimator 48 for estimating the transmission path distortion during the preamble period by using a pair of signals whose phase has been rotated by phase rotator 43. The terminal further includes a tap coefficients setter 49 for calculating tap coefficients necessary for equalizer 50 on the basis of the transmission path distortion determined by transmission path distortion estimator 48 and setting the coefficients to equalizer 50. The terminal further includes a equalizer 50 for equalizing the pair of signals from phase rotator 43 on the basis of the tap coefficient set by tap coefficient setter 49 to perform a demodulation.

2. Description of the Prior Art:

Among radio data communication terminals which operate in accordance with the narrow-band modulation system such as GMSK modulation system, there are such terminals that detect a frequency offset and execute training for estimating a transmission path distortion during a preamble period.

FIG. 5 shows the construction of a conventional radio data communication terminal.

The conventional radio data communication terminal shown in FIG. 5 includes A/D converters 41 and 42 for A/D-converting I (in-phase), Q (quadrature) signals which have been orthogonally demodulated in an RF unit (not shown), phase rotator 43 for rotating the phase of the received signals by a desired phase, phase difference detection circuit 44 for detecting phase difference between the present angle and an angle before one period, average value calculating circuit 45 for calculating an average value by summing the phase differences detected by phase difference detection circuit 44 by a predetermined number of times and dividing the summation by the predetermined number and the number of symbols in the period, integration circuit 46 for integrating the average detected by average value calculating circuit 45 every symbol time, vector resolving circuit 47 for resolving the integrated value supplied from integration circuit 46 to a real part and an imaginary part and outputting them to phase rotator 43, a transmission path distortion estimator 48 for estimating the transmission path distortion during the preamble period by using a pair of signals whose phase has been rotated by phase rotator 43, tap coefficients setter 49 for calculating tap coefficients necessary for equalizer 50 on the basis of the transmission path distortion determined by transmission path distortion estimator 48 and setting the coefficients to equalizer 50, and equalizer 50 for equalizing the pair of signals from phase rotator 43 on the basis of the tap coefficients set by tap coefficient setter 49 to perform a demodulation.

At a transmission side, the same PN sequence (pseudo noise sequence) is repetitively transmitted during a preamble period inserted before an information data period. At a radio data communication terminal, phase difference detection circuit 44 detects the phase difference between samples which are apart from each other by the period of the PN sequence during a predetermined period within the preamble period. Average value calculating circuit 45 divides the phase difference between the samples which are apart from each other by the period of the PN sequence by the number of symbols during one period of the PN sequence to calculate a symbol-based phase difference $\Delta\theta$ (frequency offset value), and hold this phase difference $\Delta\theta$ during one frame period comprising the preamble period and the information data period. Integration circuit 46 integrates the phase difference $\Delta\theta$ on a symbol basis, and vector resolving circuit 47 resolves the output of integration circuit 46 to vector components. Phase rotator 43 corrects the phase at the receiver side by using the output of vector resolving circuit 47. After the phase difference $\Delta\theta$ is calculated, transmission path distortion estimator 48 estimates the transmission path distortion, and tap coefficient setter 49 calculates the tap coefficients necessary for equalizer 50 on the basis of the transmission path distortion thus determined and sets the tap coefficients to equalizer 50.

Furthermore, according to another prior art disclosed in JPA-6-252698, an automatic adaptive equalizing means repetitively reads a training signal from storage means until tap coefficients or an impulse response converges to the transfer function of a transmission path, whereby the training sequence can be shortened. Therefore, the training signal to be added before the data signal in the same frame of the signal transmitted from the transmission side can be shortened to enhance the information transfer efficiency.

In the prior art shown in FIG. 5, it is necessary to successively perform the detection of the frequency offset value, the estimation of the transmission path distortion, the setting of the tap coefficients to the equalizer, etc. in this order within the preamble period before the equalizer is actuated, and thus the preamble period is lengthened. Therefore, this technique has a disadvantage that the information transfer efficiency is reduced.

Further, in the prior art disclosed in JPA-6-252698, when the same training signal is repetitively read out from the storage means in the process of converging the tap coefficients or the impulse response to the transfer function of the transmission path, there is a disadvantage that the processing time of the operation become increased.

SUMMARY OF THE INVENTION

In order to overcome the aforementioned disadvantages, the present invention has been made and accordingly has an object to provide radio data communication terminal of a narrow-band modulation type which can determine a frequency offset value used for phase rotation means and set tap coefficients used in an equalizer by using the shortest preamble.

According to the present invention, there is provided a radio data communication terminal, which includes a phase rotating means for correcting a phase error of a frame signal which conforms to a narrow-band modulation system. The terminal further includes an equalizer for correcting a transmission path distortion of the frame signal corrected in phase. The terminal further includes a calculating means for calculating the phase error by using a preamble in the frame signal, wherein the phase error is used for the phase error correction in the phase rotating means. The terminal further includes a transmission path distortion estimating means for estimating the transmission path distortion by using the preamble in the frame signal corrected in phase and calculating tap coefficients necessary for the equalizer. The terminal further includes a setting means for setting the tap coefficients to the equalizer. The terminal further includes a first delay means for delaying the frame signal. The terminal further includes a selection means for selecting an input or output of the first delay means and outputting the selected one to the phase rotating means so that the calculating means and the transmission path distortion estimating means operate while using the same portion of the preamble.

The radio data communication terminal may further comprise second delay means for further delaying the output of the first delay means, and the selection means may further select an output of the second delay means so that information data in the frame signal is input to the phase rotating means after the setting operation of the setting means is completed.

In the ratio data communication terminal, the calculating means may comprise: phase difference detection means for detecting a phase difference between two symbols in the preamble, wherein the two symbols are apart from each other by a predetermined period; average value calculating means for calculating an average phase difference per symbol as a frequency offset; integrating means for integrating the frequency offset every symbol; and vector resolving means for resolving an output of the integrating means into a real part and an imaginary part.

In the radio data communication terminal, the narrow-band modulation system may be a GMSK modulation system.

According to the present invention, a preamble period can be shortened because the same portion of a preamble is used for calculation of a frequency offset and estimation of a transmission path distortion.

BRIEF DESCRIPTION OF THE DRAWINGS

FIG. 4 is a timing chart showing the operation of the radio data communication terminal according to the embodiment of the present invention; and FIG. 5 is a block diagram showing the construction of a conventional radio data communication terminal.

DETAILED DESCRIPTION OF THE PREFERRED EMBODIMENT

A preferred embodiment according to the present invention will be described hereunder with reference to the accompanying drawings.

Figure 1:
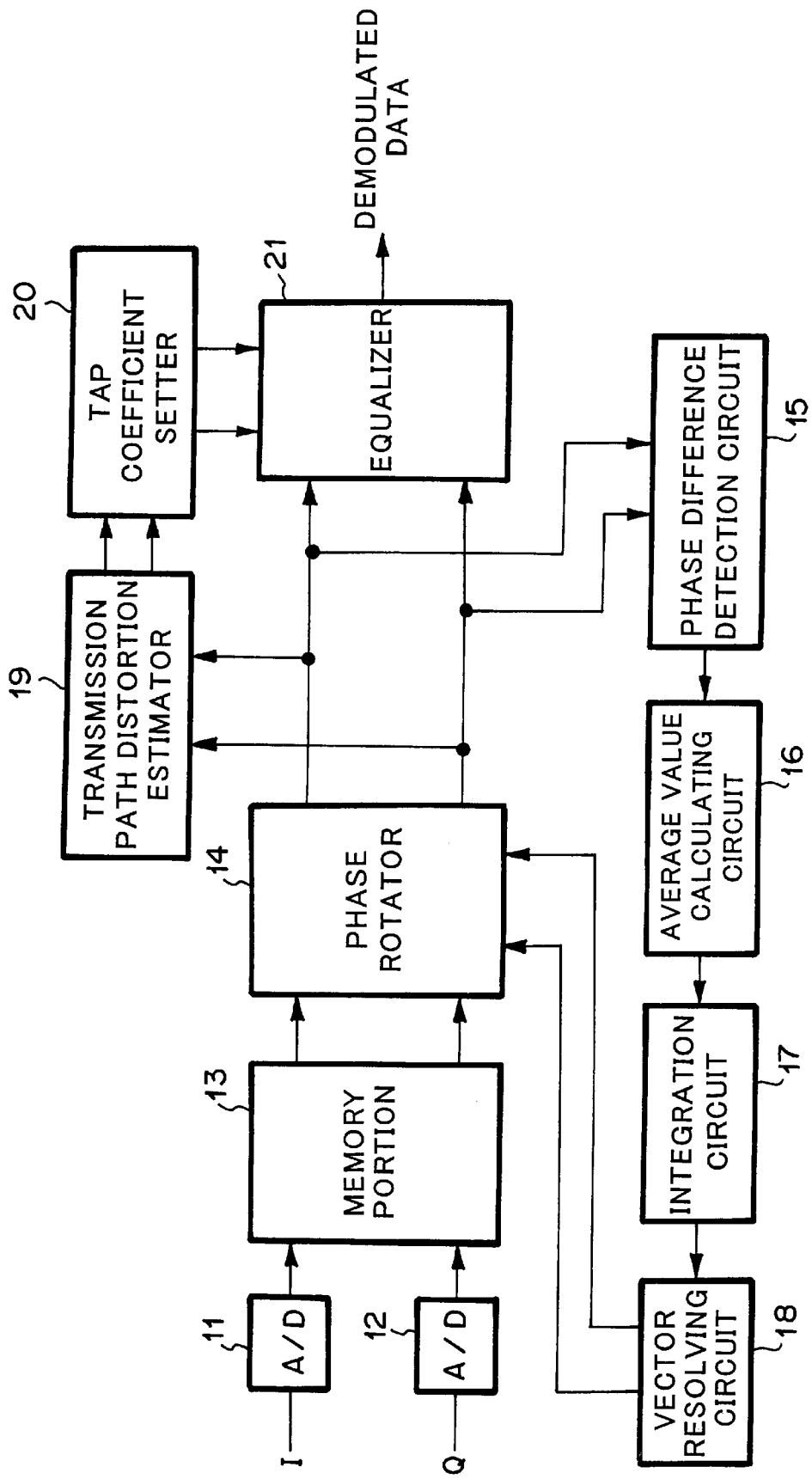
FIG. 1 is a block diagram showing the construction of a radio data communication terminal according to an embodiment of the present invention.

A radio data communication terminal according to the embodiment of the present invention shown in FIG. 1 includes A/D converters 11 and 12 for A/D-converting I, Q signals which have been orthogonally demodulated in an RF unit (not shown). The terminal further includes a memory portion 13 for storing the outputs of A/D converters 11, 12 for a predetermined period and outputting controlled signals. The terminal further includes a phase rotator 14 for rotating the phase of the outputs of memory portion 13 by a desired phase. The terminal further includes a phase difference detection circuit 15 for detecting phase difference between the present angle and an angle before one period of a PN sequence. The terminal further includes an average value calculating circuit 16 for calculating an average phase difference between adjoining symbols by summing the phase differences detected by phase difference detection circuit 15 by a predetermined number of times and dividing the summation by the predetermined number of times and dividing of symbols in the period of a PN sequence. The terminal further includes an integration circuit 17 for integrating the average phase difference calculated by average value calculating circuit 16 every symbol time. The terminal further includes a vector resolving circuit 18 for resolving the integrated value supplied from integration circuit 17 to a real part and an imaginary part and outputting them to phase rotator 14. The terminal further includes a transmission path distortion estimator 19 for estimating the transmission path distortion for a period of PN sequence during the preamble period by using a pair of signals whose phase has been rotated by phase rotator 14. The terminal further includes a tap coefficients setter 20 for calculating tap coefficients necessary for equalizer 21 on the basis of the transmission path distortion determined by transmission path distortion estimator 19 and setting the coefficients to equalizer 21. The terminal further includes an equalizer 21 for equalizing the pair of signals from phase rotator 14 on the basis of the tap coefficients set by tap coefficient setter 20 to perform a demodulation.

Figure 2:
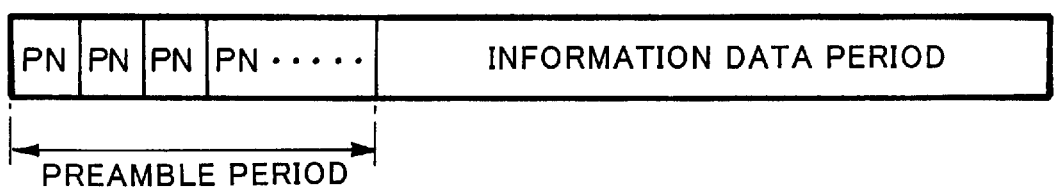
FIG. 2 is a diagram showing a transmission frame format which is treated by the radio data communication terminal according to the embodiment of the present invention.

FIG. 2 shows a transmission frame format according to the embodiment of the present invention. A transmission frame comprises a preamble period in which various types of training are carried out, and an information data period.

In this embodiment, the same PN sequence is repetitively transmitted during the preamble period. In the foregoing description, there will be described a case where the detection of the frequency offset value and the estimation of the transmission path are carried out by a signal of one period of the PN sequence.

First, on the basis of a reception signal, the phase difference between samples which are apart from each other by one period of the PN sequence within a predetermined period is divided by the number of symbols in one period of the PN sequence so as to calculate a frequency offset value per symbol. This value is held during one frame period, and integrated every symbol so as to correct the phase of each symbol of the reception signal.

In more detail, phase difference detection circuit 15 is supplied with a real part and imaginary part of a transmitted signal which has been orthogonally demodulated by a demodulator not shown and A/D-converted by A/D converters 11, 12, and obtains the present angle corresponding to a pair of the real part and imaginary part by looking up a table. Thereafter, the difference between the present angle and an angle which has been obtained from a symbol before one period of the PN sequence is calculated. This operation is repeated, for example, every symbol. Average value calculating circuit 16 is supplied with the differences predetermined number of times to calculate the average value corresponding to these differences. This averaging operation is carried out for the purpose of smoothening. This average value is set as a frequency offset value Δθ, and it is kept during the frame period. Integration circuit 17 integrates the frequency offset Δθ every symbol, and outputs the integrated value. Vector conversion resolving circuit 18 converts the output of integration circuit 17 into a real part and an imaginary part and then outputs these to phase rotator 14. Phase rotator 14 corrects the phases of the I signal and the Q signal by using the real part and imaginary part of the integrated value.

Memory portion 13 holds the preamble signal of the predetermined which was used to calculate the frequency offset value. Memory portion 13 outputs the preamble signal which has been held after the frequency offset value was calculated, and transmission path distortion estimator 19 estimates a transmission distortion by using the preamble signal output from memory portion at this moment. After finishing the estimation of the transmission outputs the data starting at the beginning of the preamble signal and terminating at the end of the information data. Also, after finishing the estimation of the transmission path distortion, tap coefficients, etc. during the period for which the preamble is output from memory portion 13 for the third time. Thereafter, phase rotator 14 compensates the frequency offset for each symbol, and equalizer 21 decodes the information data while compensating for the transmission path distortion.

Memory portion 13 will be explained in detail with reference to FIGS. 3 and 4.

Figure 3:
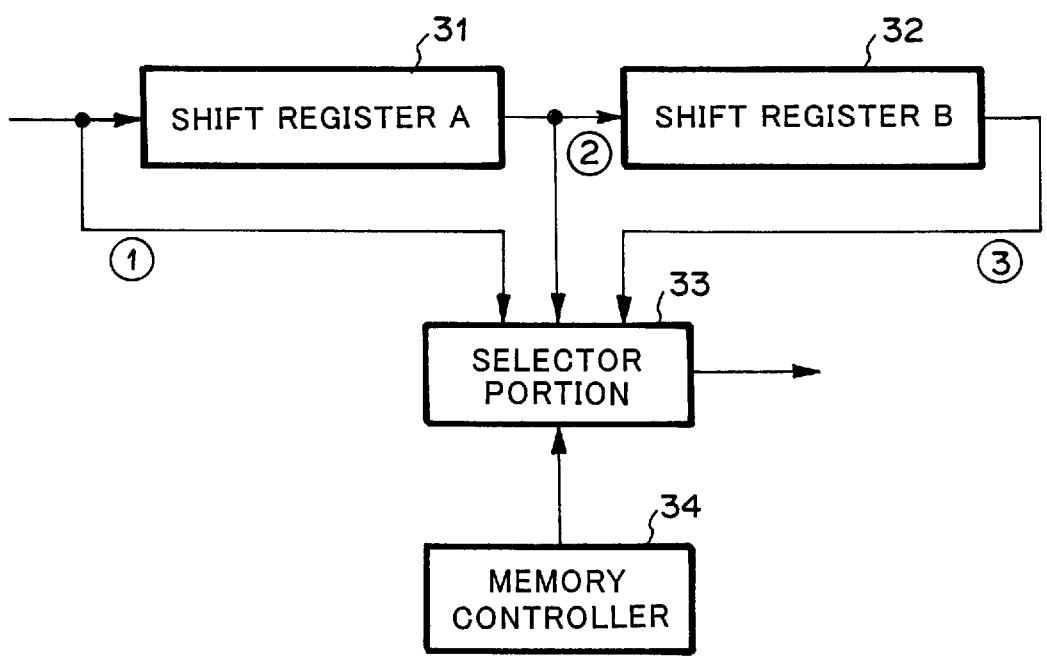
FIG. 3 is a block diagram showing the construction of memory portion 13 in FIG. 1.

Referring to FIG. 3, memory portion 13 includes shift register A 31 having a predetermined number of stages, a shift register a 32 having the predetermined number of stages, selector portion 33, and memory controller 34 for controlling selector portion 33.

Memory controller 34 controls the selector portion 33 to select route ① during a frequency offset detection period from time T1 to time T2, route ② during a transmission path estimating period from time T2 to time T3, and route ③ during a tap coefficient setting period from time T3 to time T4 and during a information data receiving period from time T4 to time T5.

However, in case that the setting of the tap coefficients and the estimation of the transmission path can be carried out at the same time, shift register B 32 is not required, and thus after time T2, memory controller 34 controls the selector portion to select route ②.

In FIG. 4, the delay time of shift register A 31 and shift register B 32 is set to be equal to the preamble period, however, the delay times of these shift registers are not limited to the preamble period.

Having explained preferred embodiments of the present invention, it will now become apparent to those of ordinary skill in the art that other embodiments incorporated these concepts may be used. Accordingly, it is submitted that the invention should not be limited to the explained embodiments but rather should be limited only by the spirit and scope of the appended claims.

What is claimed is:

1. A radio data communication terminal, which comprises:
    phase rotating means for correcting a phase error of a frame signal which conforms to a narrow-band modulation system;
    an equalizer for correcting a transmission path distortion of the frame signal corrected in phase;
    calculating means for calculating said phase error by using a preamble in the frame signal, said phase error being used for the phase error correction in said phase rotating means;
    a transmission path distortion estimating means for estimating the transmission path distortion by using the preamble in the frame signal corrected in phase and calculating tap coefficients necessary for said equalizer;
    setting means for setting the tap coefficients to said equalizer;
    first delay means for delaying the frame signal; and
    selection means for:
        selecting one of an input of said first delay means and an output of said first delay means; and
        outputting the selected one to said phase rotating means so that said calculating means and said transmission path distortion estimating means operate while using the same portion of the preamble.

2. The radio data communication terminal as claimed in claim 1, which further comprises second delay means for further delaying the output of said first delay means, and in which said selection means further selects an output of said second delay means so that information data in the frame signal is input to said phase rotating means after the setting operation of said setting means is completed.

3. The ratio data communication terminal as claimed in claim 1, wherein said calculating means comprises: phase difference detection means for detecting a phase difference between two symbols in the preamble, said two symbols being apart from each other by a predetermined period; average value calculating means for calculating an average phase difference per symbol as a frequency offset; integrating means for integrating the frequency offset every symbol; and vector resolving means for resolving an output of said integrating means into a real part and an imaginary part.

4. The radio data communication terminal as claimed in claim 1, wherein said narrow-band modulation system is a GMSK (Gaussian Minimum Shift Keying) modulation system.

5. A radio data communication terminal comprising:
    a phase rotator that corrects a phase error of a frame signal which conforms to a narrow-band modulation system;
    an equalizer for correcting a transmission path distortion of the frame signal corrected by the phase rotator;
    a calculator that calculates the phase error using a preamble in the frame signal, the phase error being used for the phase error correction in the phase rotator;
    a transmission path distortion estimator that estimates the transmission path distortion using the preamble in the frame signal and calculates tap coefficients for the equalizer;
    a tap coefficient setter that sets the tap coefficients to the equalizer;
    a memory that delays the frame signal; and
    a selector that:
        selects one of an input of the memory and an output of the memory; and
        outputs the selected one to the phase rotator so that the calculator and the transmission path distortion estimator utilize the same portion of the preamble of the frame signal.

6. The radio data communication terminal as claimed in claim 5, wherein the memory comprises:
    a first register that delays the frame signal; and
    a selector that selects one of an input signal and an output signal of the first register and outputs the selected signal to the phase rotator so that the calculator and the transmission path distortion estimator operate while using the same portion of the preamble of the frame signal.

7. The radio data communication terminal as claimed in claim 6, wherein the memory further comprises a second register that delays the output signal of the first register, and wherein the selector further selects an output signal of the second register so that information data in the frame signal is input to the phase rotator after the tap coefficient setter sets the tap coefficients to the equalizer.

8. The ratio data communication terminal as claimed in claim 5, wherein the calculator comprises:

a phase difference detection circuit that detects a phase difference between two symbols in the preamble, the two symbols being apart from each other by a predetermined period;

an average value calculating circuit that calculates an average phase difference per symbol as a frequency offset;

an integration circuit that integrates the frequency offset of every symbol; and a vector resolving circuit that resolves an output of the integration circuit into a real part and an imaginary part.

9. The radio data communication terminal as claimed in claim 5, wherein the narrow-band modulation system is a GMSK modulation system.

* * * * *